United States Patent

Okumura et al.

[11] Patent Number: 4,586,469
[45] Date of Patent: May 6, 1986

[54] INTAKE DEVICE OF AN INTERNAL COMBUSTION ENGINE

[75] Inventors: Takeshi Okumura; Kiyoshi Nakanishi; Souichi Matsushita, all of Susono, Japan

[73] Assignee: Toyota Jidosha Kabushiki Kaisha, Aichi, Japan

[21] Appl. No.: 744,997

[22] Filed: Jun. 17, 1985

[30] Foreign Application Priority Data

Aug. 29, 1984 [JP] Japan ............................ 59-178215

[51] Int. Cl.$^4$ ............................................. F02B 31/00
[52] U.S. Cl. ..................................... 123/308; 123/432; 123/188 M
[58] Field of Search ................... 123/308, 188 M, 432

[56] References Cited

U.S. PATENT DOCUMENTS 4,485,774 12/1984 Kanda et al. ....................... 123/308
4,516,544 5/1985 Okumura ........................... 123/308
4,527,519 7/1985 Oonaka et al. ..................... 123/308

FOREIGN PATENT DOCUMENTS 58-48715 3/1983 Japan .

Primary Examiner—E. Rollins Cross
Attorney, Agent, or Firm—Parkhurst & Oliff

[57] ABSTRACT

An engine having an intake port which comprises a straight port and a helical-shaped port which are separated by a separating wall. A control valve is arranged in the inlet portion of the straight port and opens when the engine is operating under a heavy load. A projection is formed on the side wall of the separating wall, which defines the straight port and is located downstream of the control valve. A bypass passage connected to the helix terminating portion of the helical portion of the helical-shaped port is formed in the separating wall. The projection has an arc-shaped cross-sectional tip face which is directed towards the upstream of the intake port. The inlet opening of the bypass passage is formed on the tip face of the projection.

9 Claims, 4 Drawing Figures

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Related Art

In order to create a strong swirl motion in the combustion chamber when the engine is operating under a light load, and to obtain a high volumetric efficiency when the engine is operating under a heavy load, an engine is known in which the interior of the intake port is divided into a straight port and a helical-shaped port by a separating wall (Japanese Unexamined Patent Publication (Kokai) No. 58-48715). In this engine, a control valve is arranged in the straight port and this valve opens when the engine is operating under a heavy load. In addition, a bypass passage is branched from the straight port downstream of the control valve and is connected to the helix terminating portion of the helical portion of the helical-shaped port. In this engine, when the engine is operating under a light load, the control valve is closed. As a result, since the entire volume of air is introduced into the helical-shaped port, a strong swirl motion is created in the combustion chamber. Contrary to this, when the engine is operating under a heavy load, the control valve is open. As a result, the flow area of the intake port is increased, and a swirl motion created in the helical portion of the helical-shaped port is weakened by the air flowing into the helix terminating portion of the helical portion from the bypass passage. Thus, the volumetric efficiency is improved.

However, in this engine, since the inlet opening of the bypass passage is formed on the flat side wall of the separating wall, the amount of air flowing into the bypass passage is small when the control valve is open. As a result, it is difficult to sufficiently weaken the swirl motion created in the helical portion of the helical-shaped port, and thus a problem occurs in that a satisfactorily high volumetric efficiency cannot be obtained.

SUMMARY OF THE INVENTION

An object of the present invention is to provide an intake system of an internal combustion engine, which is capable of creating a strong swirl motion in the combustion chamber when the engine is operating under a light load and capable of obtaining a satisfactorily high volumetric efficiency when the engine is operating under a heavy load.

According to the present invention, there is provided an intake device of an internal combustion engine, comprising: an intake port; a separating wall arranged in the intake port and dividing an interior of the intake port into a straight port and helical-shaped port which has a helical portion having a helix terminating portion; a control valve arranged in the straight port; a projection formed on a side wall of the separating wall, which defines the straight port, at a position downstream of the control valve, the projection having a tip face directed upstream of the intake port; a bypass passage formed in the separating wall and having an inlet opening and an outlet opening which is open to the helix terminating portion, the inlet opening being formed on said tip face; and an actuator for actuating the control valve in response to an engine load to close the control valve when the engine load is lower than a predetermined load and to open the control valve when the engine load is higher than the predetermined load.

The present invention may be more fully understood from the description of a preferred embodiment of the invention set forth below, together with the accompanying drawings.

DESCRIPTION OF THE PREFERRED EMBODIMENT

Figure 1:
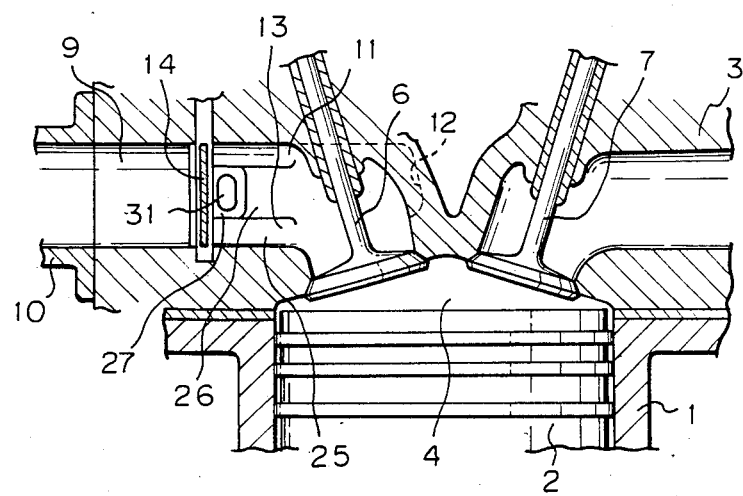
FIG. 1 is a cross-sectional side view of an engine, taken along the line II—II in FIG. 2.
Figure 2:
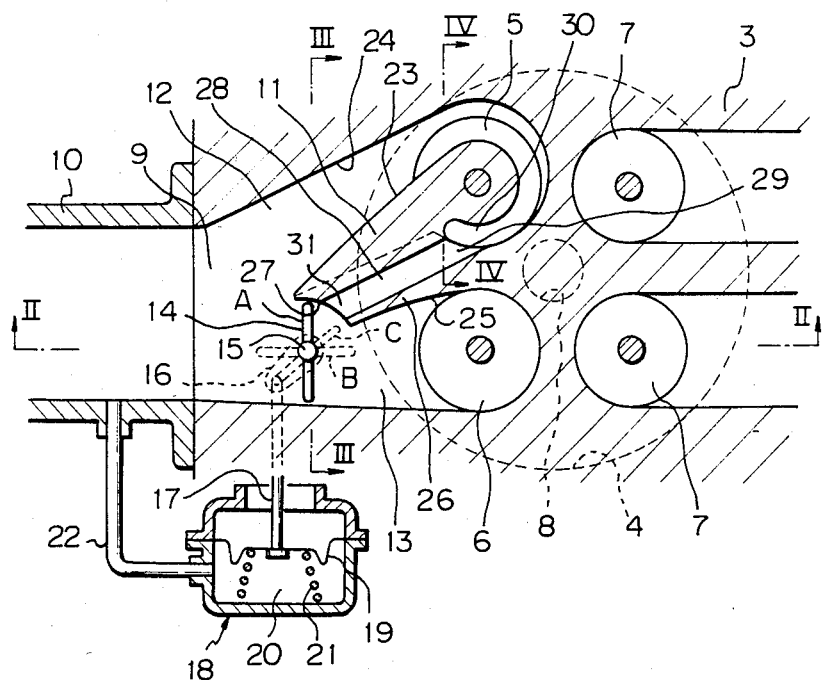
FIG. 2 is a cross-sectional plan view of the engine illustrated in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber; 5 designates a first intake valve, 6 a second intake valve, 7 exhaust valves, and 8 a spark plug; 9 designates an intake port formed in the cylinder head 3, and 10 an intake manifold. The interior of the intake port 9 is divided into a helical-shaped port 12 and a straight port 13 by means of a separating wall 11 which extends within the intake port 9 from the first intake valve 5 and the second intake valve 6 towards the intake manifold 10. A control valve 14 is arranged in the inlet portion of the straight port 13, and the tip of an arm 16 fixed to the valve shaft 15 of the control valve 14 is connected to a diaphragm 19 of a vacuum-operated actuator 18 via a control rod 17. A compression spring 21 for biasing the diaphragm is arranged in a vacuum chamber 20 of the actuator 18, and the vacuum chamber 20 is connected to the interior of the intake manifold 10 via a vacuum conduit 22. When the engine is operating under a light load, the level of vacuum in the intake manifold becomes high. As a result, the diaphragm 19 moves towards the vacuum chamber 20, and thus the control valve 14 closes the inlet portion of the straight port 13 as illustrated by the solid line A in FIG. 2. Contrary to this, when the engine is operating under a heavy load, the level of vacuum in the intake manifold 10 becomes low. As a result, the diaphragm 19 moves towards the control valve 14, and thus the control valve 14 opens the inlet portion of the straight port 13 to the maximum extent as illustrated by the broken line B in FIG. 2.

Figure 3:
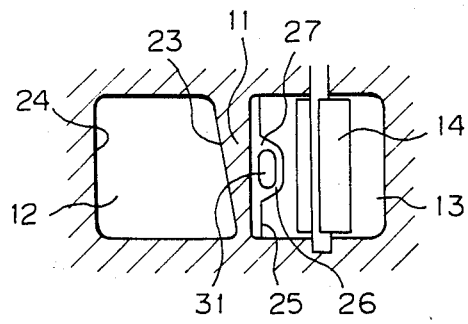
FIG. 3 is a cross-sectional view of the intake port, taken along the line III—III in FIG. 2; and, FIG. 4 is a cross-sectional view of the helical-shaped port, taken along the line IV—IV in FIG. 2.
Figure 4:
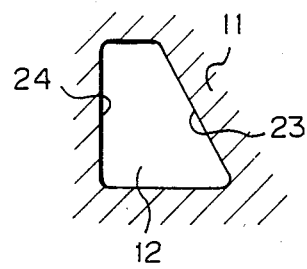

As illustrated in FIGS. 2 through 4, the side wall 23 of the separating wall 11, which defines the helical-shaped port 12, is formed by an inclined wall directed downward, and the side wall 24 of the helical-shaped port 12, which faces the side wall 23 of the separating wall 11, is substantially vertically arranged. As illustrated in FIGS. 1 through 3, a projection 26 is formed on the side wall 25 of the separating wall 11, which defines the straight port 13, at a position half way between the top and bottom of the side wall 25 of the separating wall 11. This projection 26 has an arc-shaped cross-sectional tip face 27 directed upstream of the intake port 9. As can be seen from FIG. 2, the peripheral edge portion of the control valve 14 moves along the arc-shaped cross-sectional tip face 27. A straight bypass passage 28 extends through the separating wall 11 and the projection 26 formed on the separating wall 11, and the outlet opening 29 of the bypass passage 28 is open to the helix terminating portion 30 of the helical portion of the helical-shaped port 12 in the vicinity of the upper wall of the helical portion. The inlet opening 31 of the bypass passage 28 is formed on the tip face 27 of the projection 26.

As mentioned above, when the engine is operating under a light load, the control valve 14 closes the inlet portion of the straight port 13 as illustrated by the solid line A in FIG. 2. Consequently, at this time, the entire volume of air is introduced into the helical-shaped port 12, and thus a strong swirl motion is created in the combustion chamber 4. When the degree of opening of the throttle valve (not shown) arranged in the inlet portion of the intake manifold 10 becomes large, the level of vacuum in the intake manifold 10 decreases and, as a result, the control valve 14 is half open as illustrated by the broken line C in FIG. 2. At this time, since the inlet opening 31 of the bypass passage 28 is open to the intake port 9 upstream of the control valve 14 towards the upstream of the intake port 9, the air is able to easily flow into the bypass passage 28. In addition, at this time, since the air is guided into the inlet opening 31 of the bypass passage 28 by means of the control valve 14, a large amount of the air flows into the helix terminating portion 30 of the helical portion via the bypass passage 28. The air flowing out of the outlet opening 29 of the bypass passage 28 comes into head-on collision with the air stream swirling in the helical portion of the helical-shaped port 12 and, as a result, the swirl motion is weakened. In addition, at this time, a small amount of air passes through the spaces formed above and beneath the projection 26 and then flows into the combustion chamber 4 via the straight port 13. As mentioned above, when the engine is operating under a medium load, since the swirl motion created in the helical portion of the helical-shaped port 12 is weakened, the volumetric efficiency is increased.

When the engine is operating under a heavy load, the control valve 14 is open to the maximum extent as illustrated by the broken line B in FIG. 2. At this time, since the inlet opening 31 of the bypass passage 28 is also open to the intake port 9 upstream of the control valve 14 towards the upstream of the intake port 9, a large amount of air flows into the helix terminating portion 30 of the helical portion of the helical-shaped port 12 via the bypass passage 28, and thus the swirl motion created in the helical portion of the helical-shaped port 12 is weakened. As mentioned above, when the engine is operating under a heavy load, since the control valve 14 opens to the maximum extent, the flow area of the intake port 9 is increased. In addition, at this time, the swirl motion is weakened. As a result, a satisfactorily high volumetric efficiency can be obtained.

As is apparent from the above description, as the degree of opening of the control valve 14 increases, the opening area of the inlet opening 31 of the bypass passage 28 gradually increases, and thus the swirl motion created in the helical portion of the helical-shaped port 12 is gradually weakened. Then, since the opening area of the straight port 13 gradually increases, the flow area of the intake port 9 gradually increases. Consequently, the volumetric efficiency gradually and smoothly increases as the degree of opening of the control valve 14 increases.

According to the present invention, since the inlet opening 31 of the bypass passage 28 is formed so that it is open to the intake port 9 upstream of the control valve 14 towards the upstream of the intake port 9, air is able to easily flow into the bypass passage 28. As a result, when the control valve 14 is open, since a large amount of air flows into the helix terminating portion 30 of the helical portion of the helical-shaped port 12, the swirl motion created in the helical portion of the helical-shaped port 12 is sufficiently weakened, and thus it is possible to obtain a satisfactorily high volumetric efficiency.

While the invention has been described by reference to a specific embodiment chosen for purposes of illustration, it should be apparent that numerous modifications could be made thereto by those skilled in the art without departing from the basic concept and scope of the invention.

We claim:

1. An intake device of an internal combustion engine, comprising:
    an intake port;
    a separating wall arranged in said intake port and dividing an interior of said intake port into a straight port and a helical-shaped port which has a helical portion having a helix terminating portion;
    a control valve arranged in said straight port;
    a projection formed on a side wall of said separating wall, which defines said straight port, at a position downstream of said control valve, said projection having a tip face directed upstream of said intake port;
    a bypass passage formed in said separating wall and having an inlet opening and an outlet opening which is open to said helix terminating portion, said inlet opening being formed on said tip face; and
    an actuator for actuating said control valve in response to an engine load to close said control valve when the engine load is lower than a predetermined load and to open said control valve when the engine load is higher than the predetermined load.

2. An intake device according to claim 1, wherein the tip face of said projection has an arc-shaped cross-section, and said control valve has a peripheral edge portion which moves along said tip face when said control valve is rotated.

3. An intake device according to claim 2, wherein said control valve guides air into the inlet opening of said bypass passage when said control valve is half open.

4. An intake device according to claim 1, wherein said projection is formed at a position half way between the top and bottom of the side wall of said separating wall, air flow spaces being formed above and beneath said projection.

5. An intake device according to claim 1, wherein said bypass passage extends straight.

6. An intake device according to claim 5, wherein the outlet opening of said bypass passage is open to said helix terminating portion in the vicinity of an upper wall of said helical portion.

7. An intake device according to claim 1, wherein said straight port has an inlet portion, and said control valve is arranged in said inlet portion.

8. An intake device according to claim 1, wherein said separating wall has a side wall defining said helical-shaped port and inclined so as to be directed downward.

9. An intake device according to claim 1, wherein said actuator comprises a diaphragm connected to said control valve, and a vacuum chamber connected to said intake port for gradually opening said control valve as the level of vacuum in said intake port decreases.

* * * * *